(12) United States Patent
Hinnrichs

(10) Patent No.: US 7,910,890 B2
(45) Date of Patent: Mar. 22, 2011

(54) INFRARED CAMERA SYSTEM WITH DIFFRACTIVE OPTICAL ARRAY

(75) Inventor: Michele Hinnrichs, Solvang, CA (US)

(73) Assignee: Pacific Advanced Technology, Solvang, CA (US)

( * ) Notice: Subject to any disclaimer, the term of this patent is extended or adjusted under 35 U.S.C. 154(b) by 38 days.

(21) Appl. No.: 12/555,125

(22) Filed: Sep. 8, 2009

(65) Prior Publication Data
US 2009/0321645 A1    Dec. 31, 2009

Related U.S. Application Data

(63) Continuation-in-part of application No. 11/844,391, filed on Aug. 24, 2007, now abandoned.

(60) Provisional application No. 60/839,894, filed on Aug. 24, 2006.

(51) Int. Cl.
*G01J 5/08* (2006.01)

(52) U.S. Cl. .................. 250/339.03; 250/338.5

(58) Field of Classification Search .............. 250/338.5, 250/339.03, 340, 347, 352
See application file for complete search history.

(56) References Cited

U.S. PATENT DOCUMENTS

| | | | |
|---|---|---|---|
| 4,806,761 A | 2/1989 | Carson et al. | |
| 5,041,723 A * | 8/1991 | Ishida et al. | 250/339.01 |
| 5,473,162 A | 12/1995 | Busch et al. | |
| 5,479,258 A | 12/1995 | Hinnrichs et al. | |
| 5,834,778 A | 11/1998 | Veyrier et al. | |
| 6,023,061 A | 2/2000 | Bodkin | |
| 6,122,919 A | 9/2000 | Patel et al. | |
| 6,133,569 A | 10/2000 | Shoda et al. | |
| 6,144,031 A | 11/2000 | Herring et al. | |
| 6,476,391 B1 | 11/2002 | Zhang | |
| 6,509,520 B1 | 1/2003 | Kyle et al. | |
| 6,515,285 B1 | 2/2003 | Marshall et al. | |
| 6,853,452 B1 | 2/2005 | Laufer | |
| 7,105,821 B1 | 9/2006 | Kennedy et al. | |
| 7,435,964 B2 * | 10/2008 | Lane et al. | 250/346 |
| 2005/0156111 A1 | 7/2005 | Racca et al. | |

* cited by examiner

Primary Examiner — David P Porta
Assistant Examiner — Marcus H Taningco
(74) Attorney, Agent, or Firm — Quinn Law Group, PLLC

(57) ABSTRACT

An apparatus and method for imaging incoming radiation. The apparatus includes a radiation shield unit having a cavity. A detector array is positioned at least partially within the cavity and has a planar surface with at least one infrared detector affixed on the detector array. A diffractive optical array is positioned within the cavity and is in thermal communication with the radiation shield unit. The diffractive optical array is configured to diffract and direct the spectral components of the incoming radiation onto the detector array. The apparatus is in an external environment having a predetermined ambient temperature. The radiation shield unit, diffractive optical array and detector array may be temperature-controlled to a temperature that is within a few degrees of the ambient temperature. The radiation shield unit, diffractive optical array and detector array may be temperature-controlled to cryogenic temperatures.

20 Claims, 3 Drawing Sheets

INFRARED CAMERA SYSTEM WITH DIFFRACTIVE OPTICAL ARRAY

CROSS REFERENCE TO RELATED APPLICATIONS

This application is a continuation-in-part of application Ser. No. 11/844,391, filed Aug. 24, 2007, which claims the benefit of U.S. Provisional Application No. 60/839,894, filed Aug. 24, 2006, and both of which are hereby incorporated by reference in their entirety.

TECHNICAL FIELD

The invention relates generally to infrared cameras. More particularly, the invention relates to an infrared camera system that is coupled with a diffractive optical array having at least one diffractive optic lens.

BACKGROUND OF THE INVENTION

Infrared detectors are used to detect infrared radiation emitted by a target or generally present in the atmosphere. There are two generic types of infrared detectors: cooled detectors that must be maintained at cryogenic temperatures and uncooled detectors.

SUMMARY OF THE INVENTION

An apparatus and method for imaging incoming radiation is provided. The apparatus includes a radiation shield unit having a cavity. A detector array is positioned within the cavity and has a planar surface with at least one infrared detector affixed to the detector array. A diffractive optical array is positioned within the cavity and in thermal communication with the radiation shield unit. The diffractive optical array is spaced from the detector array and includes at least one diffractive optic lens. The diffractive optical array is configured to diffract and direct the spectral components of the incoming radiation onto the detector array. The apparatus is in an external environment having a predetermined ambient temperature. The diffractive optical array and radiation shield unit may be temperature-controlled to a first temperature. The detector array may be temperature-controlled to a second temperature. The first and second temperatures may be within a few degrees of the ambient temperature. The first temperature or second temperature or both may also be cryogenic temperatures. The first temperature may be different or the same as the second temperature.

The apparatus may be used for measuring the emission or absorption of one or more gases emanating from sources such as smoke stacks or flares and identifying the species based on its spectral properties. The diffractive optical array diffracts the spectral components of each gas emitted and focuses the image of the spectral components in the field of view of the apparatus onto a portion of the detector array. The gases are identified by comparing the spectral components to known spectral signatures. U.S. Pat. No. 5,479,258 to Hinnrichs et al. describes a device that records the spectrum of individual targets within an image or scene. U.S. Pat. No. 5,479,258 to Hinnrichs et al. is hereby incorporated by reference in its entirety.

By controlling the temperature of the detector array, the diffractive optical array and the radiation shield unit, an improvement in the signal to noise ratio of the image is obtained. Additionally, the apparatus allows for remote measurement and identification of greenhouse gases emitted from sources such as stack and flares.

The diffractive optical array may include a square grid having any number of diffractive optic lenses. A programmable moving element may be operatively connected to the detector array or the diffractive optical array, the moving element being configured to change the distance, i.e. the focal length, between the diffractive optical array and the detector array by known increments.

The detector array may include a first material stacked in a direction substantially perpendicular to an optical axis. The first material is configured to be sensitive to a first part of a spectrum. A second material that is stacked in a direction substantially perpendicular to an optical axis may be added. The second material is configured to be sensitive to a second part of the spectrum.

The detector array may include first, second and third materials that are stacked in a direction substantially perpendicular to the optical axis. The first material is configured to be sensitive to long wavelength infrared radiation approximately between 8 and 14 $\mu m$ in wavelength. The second material is configured to be sensitive to middle wavelength infrared radiation approximately between 3 and 5 $\mu m$ in wavelength. The third material is configured to be sensitive to short wavelength infrared radiation approximately between 1 and 3 $\mu m$ in wavelength.

The apparatus may include a housing enclosing the radiation shield unit, the housing having an interior portion that is vacuum-sealed. A housing window may be attached to the housing to direct the incoming radiation into the diffractive optical array. An enclosure may be placed surrounding the housing, the enclosure having an enclosure window to permit transmission of the incoming radiation. A collimating lens may be positioned between the housing window and the diffractive optical array.

The apparatus may include a power source operatively connected to the detector array for powering the detector array. A wireless data link may be operatively connected to the detector array to remotely transmit images received by the detector array. A controller may be operatively connected to the detector array for recording the distance between the diffractive optical array and the detector array. A temperature sensor may be operatively connected to the controller to measure the ambient temperature in the external environment. The apparatus may include a global position indicator system for determining the location of the apparatus.

The radiation shield unit in the apparatus may include a first aperture at a first end of the cavity and a second aperture at a second end of the cavity. The diffractive optical array may be fitted within the first aperture, the diffractive optical array being movable within the cavity. The detector array may be fitted within the second aperture, the detector array being movable within the cavity.

The radiation shield unit has a dimension substantially parallel to an optical axis. This dimension may be made variable between a first length L1 and a second length L2. The radiation shield unit may include a bellows-like element that is configured to expand or contract in a direction substantially parallel to an optical axis, in order to vary the dimension between a first length L1 and a second length L2.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
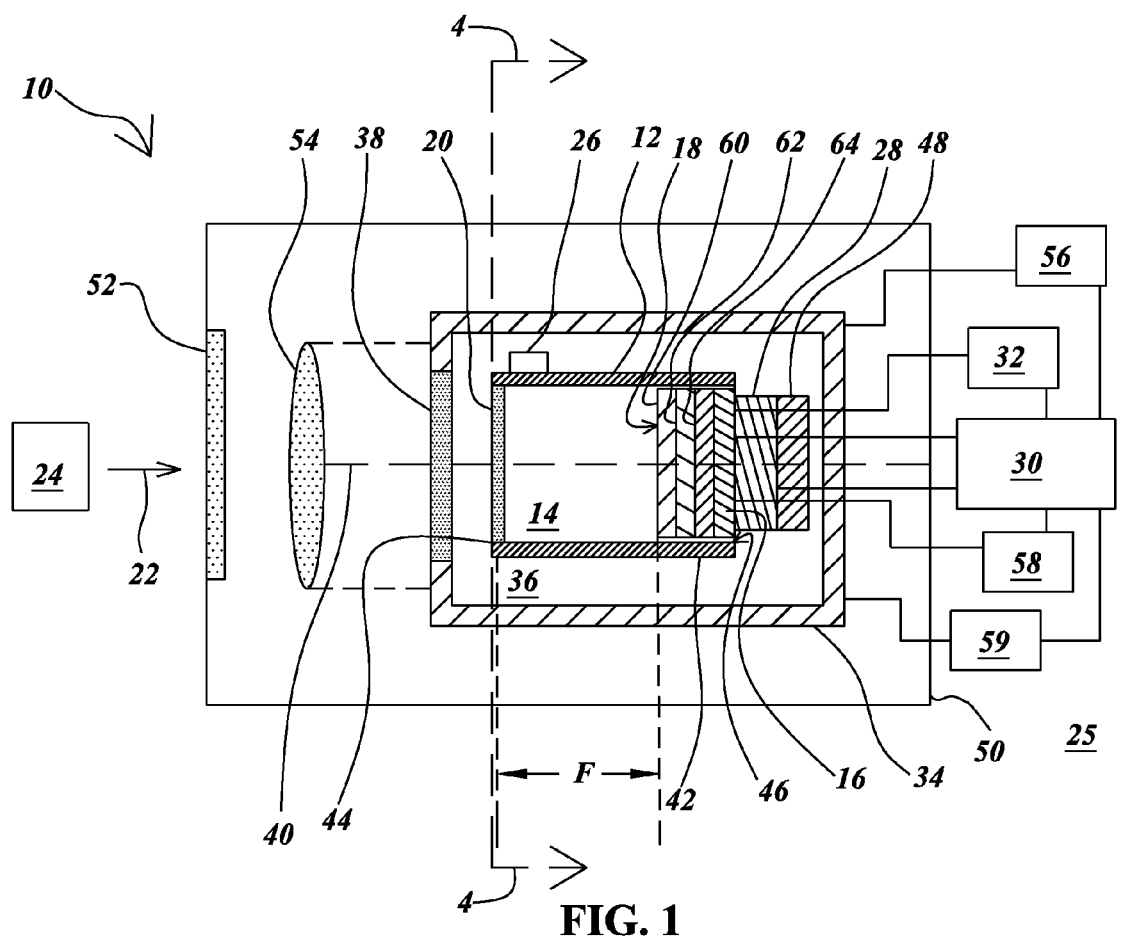
FIG. 1 is a schematic sectional view of an apparatus according to a preferred embodiment of the apparatus.

FIG. 1 is a schematic sectional view of an apparatus 10, according to a preferred embodiment of the invention. The apparatus 10 includes a radiation shield unit 12 having an inner cavity 14. A detector array 16 is positioned within the cavity 14. The detector array 16 has a planar surface 18 with at least one infrared detector affixed to the detector array 16. A diffractive optical array 20 is positioned within the cavity 14. The diffractive optical array 20 is in thermal communication with the radiation shield unit 12. The diffractive optical array 20 is spaced from the detector array 16 by a distance F. The diffractive optical array 20 is configured to image, diffract and direct the spectral components of incoming radiation 22 from a source 24 onto the detector array 16. The diffractive optical array 20 may include a single diffractive optic lens, or a plurality of diffractive optic lenses. The apparatus is in an external environment 25 having a predetermined ambient temperature. The diffractive optical array 20 and radiation shield unit 12 are cooled or warmed by a first cooler 26 to a first temperature. The detector array 16 is cooled or warmed by a second cooler 28 to a second temperature. The first and second temperatures may be different or the same.

In one embodiment, the first and second temperatures are within a few degrees of the ambient temperature; for example, the first and second temperatures may be within approximately plus 10 and minus 15 degrees Celsius of the ambient temperature. A thermoelectric cooler such as a Peltier cooler may be used. In this embodiment, the detector array 16 includes one or more uncooled infrared detectors. The detector array 16 may utilize microbolometer, ferroelectric, pyroelectric technologies for the uncooled detectors.

In a second embodiment, detector array 16 includes one or more cooled infrared detectors and the second temperature is a cryogenic temperature; for example, the second temperature may be approximately 123 K or below. A cryogenic cooler such as a Sterling cooler may be used. The detector array 16 may utilize InSb, InAsGa or HgCdTe detector materials for the cooled detectors. Cryogenic temperatures are defined as temperatures needed to operate the infrared detector material. Detectors materials such as InSb and HgCdTe can be operated at approximately 77 K and below. However, detectors materials such as InGaAs may be operated at temperatures above 77K, which remains a cryogenic temperature. The first temperature of the diffractive optical array 20 and radiation shield unit 12 may be maintained within a few degrees of the ambient temperature or be at cryogenic temperatures.

A controller 30, performing multiple functions, may be operatively connected to the detector array 16, shown in FIG. 1. The controller 30 may function as a temperature controller and regulate the operation of the first and second coolers 26, 28. The controller 30 may record the distance F between the diffractive optical array 20 and the detector array 16. For every value of F, which corresponds to a focal distance for radiation of a particular wavelength, different spectral components of the image will be brought into focus on the detector array 16. The controller 30 may measure and store the intensity of the spectral components of the radiation impinging upon each pixel (not shown) in the detector array 16. The data collected may be transmitted remotely to an operator through a wireless data link 32. The controller 30 includes the electronics required for the functioning of the apparatus 10.

In order to identify the incoming radiation 22, the controller 30 may include a correlating function to compare the spectral components of the incoming radiation with spectral components of known sources. Multiple sources may be identified by recording the spectral components of each source. The amount of emissions or absorption may be computed by entering the output of each pixel (not shown) into a predetermined algorithm.

As shown in FIG. 1, a housing 34 encloses the radiation shield unit 12, providing structural rigidity to the apparatus 10. The housing 34 has an interior portion 36 that is vacuum-sealed, thereby providing a controlled environment. A housing window 38 in the housing 34 directs the incoming radiation 22 onto the diffractive optical array 20. The housing window 38 also seals the vacuum in the interior portion 36 of the housing 34. The optical axis 40 is shown in FIG. 1.

The radiation shield unit 12 is preferably made of a material with a high thermal conductivity, such as copper, aluminum or gold. The radiation shield unit 12 is adapted to reduce the amount of stray radiation from reaching the solid state imaging array (not shown) in the detector array 16. In the embodiment shown, the radiation shield unit 12 has a cylindrical body 42 with an opening or first aperture 44 at one end and an opening or second aperture 46 at the opposite end. The diffractive optical array 20 may be fitted within the radiation shield unit at the first aperture 44. The detector array 16 may be positioned in the cavity 14 through the second aperture 46. The diffractive optical array 20 and detector array 16 may be movable within the cavity 14.

A programmable moving element 48 may be connected to the detector array 16 or the diffractive optical array 20 in order to change the distance F between the diffractive optical array 20 and the detector array 16. The moving element 48 may include a piezoelectric element, stepper motor or any other translation device in order to move the detector array 16. The moving element 48 may be electronically linked to the controller 30 and programmed to move at specific increments, thereby controlling and recording the distance F between the diffractive optical array 20 and the detector array 16.

The apparatus 10 may be deployed to a remote location through an airplane, balloon or any other method. The apparatus 10 may also be placed on a pole or on the ground, away from the scene of interest. For remote deployment, an optional environmental enclosure 50 may be placed around the housing 34, as shown in FIG. 1. The enclosure 50 has an enclosure window 52 to permit transmission of the incoming radiation 20 into the apparatus 10. A collimating lens 54 may be positioned between the enclosure window 52 and the housing window 38 in the housing 34. The collimating lens 54 may be positioned in front of the housing 34 if no enclosure 50 is employed. The apparatus 10 may include a global position indicator system (GPS) 56 to indicate the location of the apparatus. The apparatus 10 may include a power source 58, such as a solar cell. A pressure sensor (not shown) may be added to ensure that there is no leakage in the vacuum-sealed interior portion 36 of the housing 34.

The apparatus 10 includes a temperature sensor 59 to measure the ambient temperature in the external environment 25 around the apparatus 10. The controller 30 is linked to the temperature sensor 59 and stores the ambient temperature measured by the temperature sensor 59. If no enclosure 50 is used, the external environment 25 of the apparatus 10 is defined as the area outside the housing 34. If an enclosure 50 is used, the external environment 25 of the apparatus 10 is defined as the area outside the enclosure 50. The temperature sensor 59 includes a sensing portion (not shown) that measures the temperature of the radiation shield unit 12 and the detector array 16.

The detector array 16, also known as a focal plan array (FPA), is made up of an electronic read out circuit (not shown) and an array of one or more detectors. The detector array 16 may be configured to include a plurality of materials that are sensitive to different parts of the spectrum, in a stacked or sandwiched detector configuration. Referring to FIG. 1, the detector array 16 includes a first material 60, second material 62 and a third material 64 which are stacked in a direction substantially perpendicular to the optical axis 40. The first material 60 is sensitive to long wavelength infrared radiation (LWIR) in the range of 8 to 14 μm. The second material 62 is sensitive to middle wavelength infrared radiation (MWIR) in the range of 3 to 5 μm. The third material 64 is sensitive to short wavelength infrared radiation (SWIR) in the range of 1 to 3 μm. The first, second and third materials 60, 62 and 64 may be chosen for sensitivity to any part of the spectrum, ranging from the ultraviolet band to the longwave length infrared band.

Figure 2:
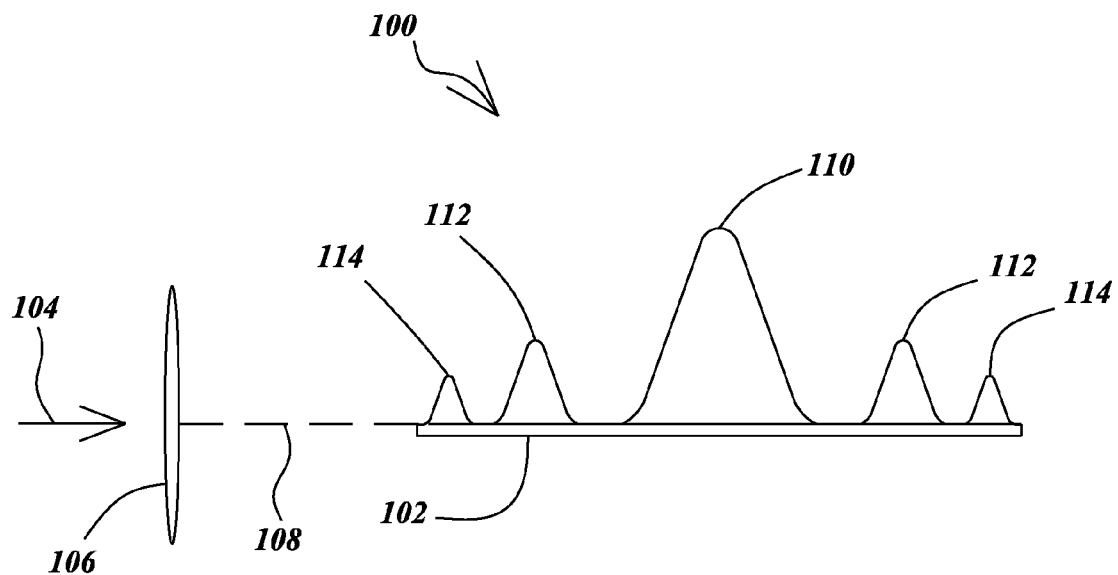
FIG. 2 is a schematic diagram illustrating the intensity distribution as a result of radiation diffracted by a diffractive optic lens.

As noted above, the diffractive optical array 20 may include a single or multiple diffractive optic lenses. FIG. 2 is a schematic diagram illustrating the intensity distribution 100 received at a detector array 102 as a result of radiation 104 diffracted by a single diffractive optic lens 106 along an optical axis 108. A physical property of diffraction is that there is a central maximum peak 110 (referred to as the first order of diffraction), flanked on either side by weaker secondary maxima. The intensity pattern includes a first secondary peak 112, referred to as the second order of diffraction and a second secondary peak 114, referred to as the third order of diffraction. Note that the first order diffraction of a wavelength $\lambda$ and the second order diffraction of a wavelength that is one-half of $\lambda$ are focused at the same focal point. The third order diffraction of a wavelength that is one-third of $\lambda$ is also focused at the same focal point. Thus, the first order diffraction of wavelength 10 μm, the second order diffraction of wavelength 5 μm and the third order diffraction of wavelength 3.333 μm are focused at the same focal point. The second order diffraction of wavelength 10 μm is focused at a different focal length from the first order diffraction of wavelength 10 μm.

Figure 3:
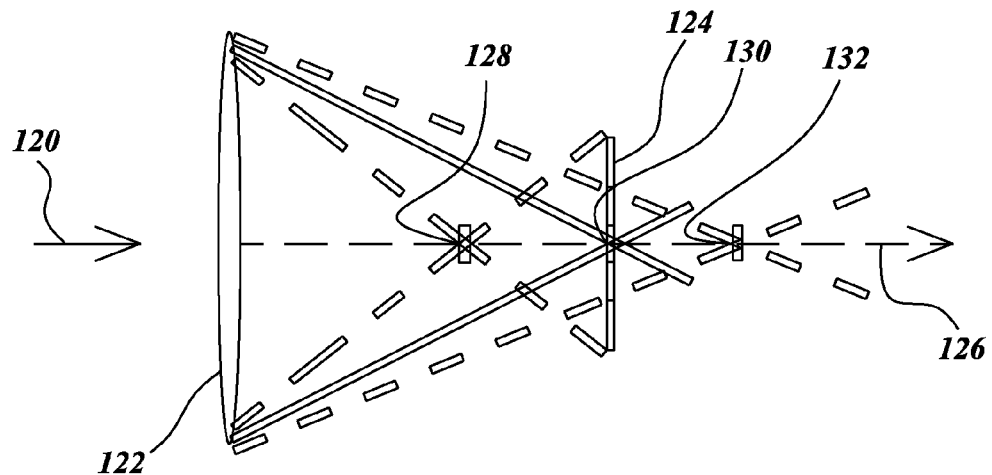
FIG. 3 is a schematic diagram illustrating how the dispersion of radiation by a diffractive optic lens brings different wavelengths to focus at different points along the optical axis.

Another property of a diffractive optic lens is that the diffractive optic lens can be designed to focus a specific wavelength at a specific focal length. Using circular blazed grating techniques, a diffractive optic lens may be produced with a series of radial rings or "zones" of decreasing width. Rays hitting the outer zones of the diffractive optic lens are deviated more than rays hitting in the centre. Thus, different wavelengths are focused at different distances behind the diffractive optic lens because rays having different wavelengths are deviated by different amounts. FIG. 3 shows radiation 120 being focused by a diffractive optic lens 122 onto a detector element 124 along the optical axis 126. Radiation with wavelength $\lambda_1$ is focused at a distance $D_1$ (shown by reference numeral 128) along the optical axis 126. Radiation with wavelength $\lambda_2$ is focused at a distance $D_2$ (shown by reference numeral 130) along the optical axis 126. Radiation with wavelength $\lambda_3$ is focused at a distance $D_3$ (shown by reference numeral 132) along the optical axis 126.

Figure 4:
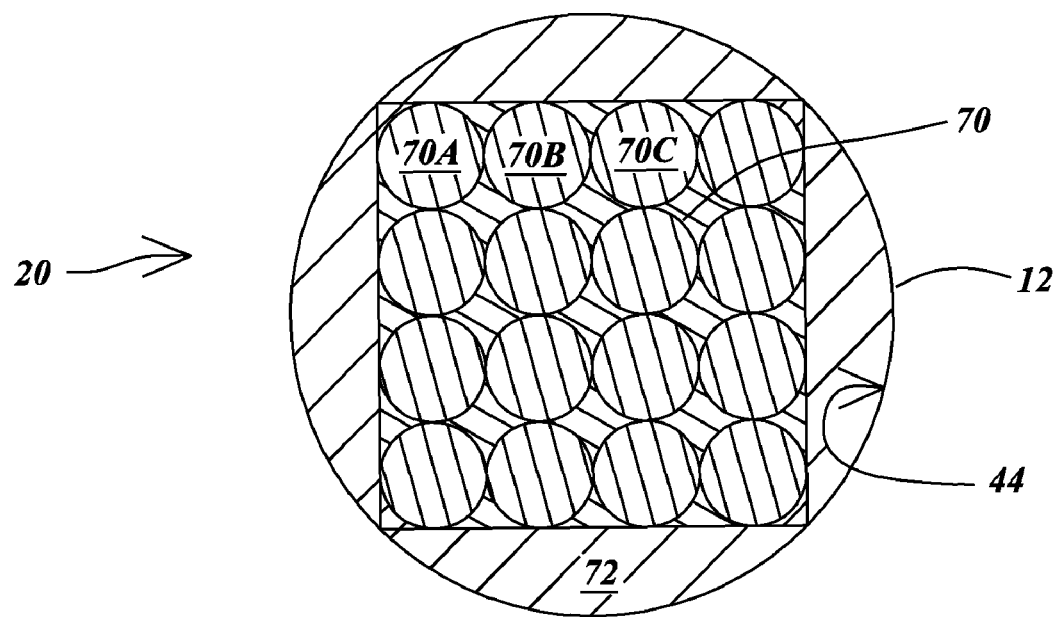
FIG. 4 is a partial or fragmentary sectional view of the diffractive optical array, taken generally along the axis 4-4 shown in FIG. 1.

FIG. 4 is a partial or fragmentary sectional view of the diffractive optical array 20, taken generally along the axis 4-4 shown in FIG. 1, showing only the portion within the radiation shield unit 12. In the embodiment shown, the diffractive optical array 20 includes 16 diffractive optic lenses, referred to herein as lenslets 70. The lenslets 70 are affixed to a planar surface or substrate 72. Any number of lenslets 70 may be employed. The shape of the substrate 72 may be made to match the first aperture 44 of the radiation shield unit 12 or vice-versa. The substrate 72 may be made of germanium, silicon, sapphire or other materials.

Each lenslet 70 will image and diffract a narrow band of radiation centered on a peak wavelength, also known as a spectral bin, onto the detector array 16 that is shown in FIG. 1. The collimating lens 54, shown in FIG. 1, may be configured to collimate the incoming radiation 22 such that each of the 16 images has the same field of view and sees the same image, but is tuned to a different peak wavelength. Each lenslet 70 may be tuned (at the time of fabrication) to focus a different peak wavelength at the same focal distance. Thus each lenslet 70, when coupled with the collimating lens 54, produces simultaneous multiple images of the same source at different wavelengths or colors. In other words, each lenslet 70 may be tuned for a different peak wavelength (or the same wavelength) for the same focal distance, thereby producing simultaneous multiple images of the scene at different colors/wavelengths. In this manner, for a fixed focal position there will be 16 different wavelength images on the detector array 16, each in a different quadrant. Each lenslet 70 may be also tuned to the same peak wavelength.

This embodiment of the diffractive optical array 20 will produce multiple spectral images without changing the spacing between diffractive optical array 20 and the detector array 16; however the spacing may be changed to accommodate more images at intermediate wavelengths. Each lenslet 70 can be a blazed grading configured as a lens.

Each lenslet 70 may be spectrally matched to a signature of a different gas of interest emanating from a source such as a flare or a smoke stack. A spectral signature is the absorption, reflection or emission of electromagnetic radiation from a substance that can uniquely identify that substance. The width of the spectral region that each lenslet 70 is detecting will be determined by the design of the diffractive optic lens within the respective lenslet 70. For example, lenslet 70A may be spectrally matched to carbon dioxide by focusing radiation around a peak wavelength of 4.5 μm. Lenslet 70B may be spectrally matched to methane by focusing radiation around a peak wavelength of 3.3 μm. Lenslet 70C may be spectrally matched to hydrogen sulfide by focusing radiation around a peak wavelength of 3.8 μm. As noted above, a correlating function may be incorporated within the controller 30 (shown in FIG. 1) to identify the gas being imaged by comparing the spectral components of the emissions with spectral signatures of known substances.

The diffractive optical array 20 can give "n" multipliers (n=1, 2, 3, 4 . . . ) of the number of spectral bins covered by taking advantage of the multiple orders of diffraction focused at the same focal length, coupled with a stacked detector, as shown in FIG. 1. As noted above, each lenslet 70 in the diffractive optical array 20 can focus radiation from the first, second and third order of diffraction at a single focal length. Each lenslet 70 in the diffractive optical array 20 may be tuned to different wavelengths at the time of fabrication. Since each lenslet 70 will focus multiple orders at a single focal length, when used with a stacked detector having two different materials that are sensitive to different wavelength regions, the number of different spectral images formed will increase from 16 to 32. More specifically, a lenslet 70 may be tuned to focus 8 μm light on the long wavelength infrared region (LWIR) detector array using the first order of diffraction and 4 μm radiation (half of 8 μm) on the mid wavelength infrared region (MWIR) detector array using the second order of diffraction, while at the same focal length. The lenslet 70 may be tuned to focus radiation of approximately 3 μm (one-third of 8 μm) on the SWIR detector array using the third order of diffraction, while at the same focal length. This example can be extrapolated to many radiation bands from ultraviolet to the very longwave length infrared.

Thus, the 16 different spectral images produced by the diffractive optical array 20 shown in FIG. 4 can be doubled to 32 different spectral images by employing a detector array 16 having a first material 60 and a second material 62 stacked together in a direction substantially perpendicular to the optical axis, where the first and second materials 60, 62 are sensitive to radiation from the first and second order of diffraction. The 16 images produced by the diffractive optical array 20 shown in FIG. 4 can be tripled to 48 images by employing a third material 64 that is stacked in a direction substantially perpendicular to the optical axis and sensitive to radiation from the third order of diffraction.

Alternate Embodiment of Radiation Shield Unit

Figure 5:
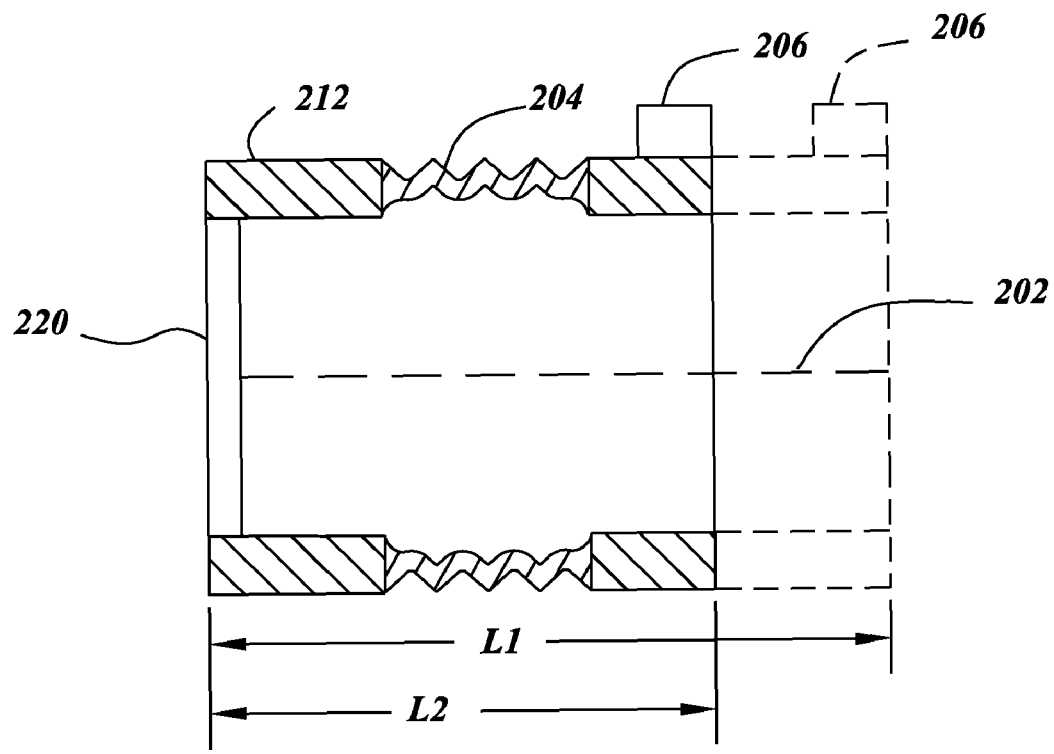
FIG. 5 is a schematic sectional view of a variable length radiation shield unit, according to an alternate embodiment of the radiation shield unit.

FIG. 5 is a schematic sectional view of an alternate embodiment of a radiation shield unit 212 having a variable length in a direction substantially parallel to an optical axis 202. A variable length radiation shield unit 212 allows a diffractive optical array 220 to have a plurality of focal lengths with respect to the detector array (not shown in FIG. 5). As shown in FIG. 5, the radiation shield unit 212 extends between an expanded length L1 and a contracted length L2. The radiation shield unit 212 includes a bellows-like element 204 that can expand and contract in a direction substantially parallel to the optical axis 202 while maintaining sufficient thermal conduction in order to control the temperature of the diffractive optical array 220 and the radiation shield unit 212. The radiation shield unit 212, including the bellows-like element 204, is preferably made of a material with a high thermal conductivity.

An actuator 206 is provided for controlling the expansion and contraction of the bellows-like element 202. The actuator 206 may include a piezoelectric element, stepper motor or any other translation device to move the bellows-like element 202 in the radiation shield unit 212, thereby allowing the diffractive optical array 220 to have a variable focal length. Any other method of controlling the distance of the detector array (not shown in FIG. 5) from the diffractive optical array 220 may be used.

In summary, by controlling the temperatures of the detector array 16, the diffractive optical array 20 and the radiation shield unit 12 (all shown in FIG. 1), an improvement in the signal to noise ratio of the image is obtained. The apparatus 10 may image and measure the emission or absorption of the gases emanating from sources such as smoke stacks or flares and identify each gas based on its spectral properties. For example, the apparatus 10 may be used to detect greenhouse gases such as methane (CH4), carbon dioxide (CO2), nitrous oxide (N2O) and others. The apparatus 10 may also be used to image and measure the emission or absorption of SOx acid rain producing gases and NOx smog producing gases.

While the best modes for carrying out the invention have been described in detail, those familiar with the art to which this invention relates will recognize various alternative designs and embodiments for practicing the invention within the scope of the appended claims.

The invention claimed is:

1. An apparatus for imaging incoming radiation, the apparatus comprising:
   a radiation shield unit having a cavity;
   a detector array positioned at least partially within the cavity, the detector array having a planar surface with at least one infrared detector affixed to the detector array;
   a diffractive optical array positioned within the cavity and in thermal communication with the radiation shield unit, the diffractive optical array including at least one diffractive optic lens;
   wherein the diffractive optical array is configured to diffract spectral components of the incoming radiation and direct the spectral components onto the detector array;
   wherein the apparatus is in an external environment having a predetermined ambient temperature;
   wherein the diffractive optical array and radiation shield unit are temperature-controlled to a first temperature; and
   wherein the detector array is temperature-controlled to a second temperature.

2. The apparatus of claim 1, wherein the first and second temperatures are within a few degrees of the ambient temperature.

3. The apparatus of claim 1, wherein the first temperature is within a few degrees of the ambient temperature and the second temperature is approximately 123 K or below.

4. The apparatus of claim 1, wherein the diffractive optical array and the detector array are spaced by a distance F and further comprising:
   a programmable moving element operatively connected to the detector array or the diffractive optical array, the moving element being configured to change the distance F between the diffractive optical array and the detector array by known increments.

5. The apparatus of claim 1, wherein the detector array includes a first material stacked in a direction substantially perpendicular to an optical axis, the first material being sensitive to a first part of a spectrum.

6. The apparatus of claim 5, further comprising a second material that is stacked in a direction substantially perpendicular to an optical axis, the second material being sensitive to a second part of the spectrum.

7. The apparatus of claim 1, wherein the detector array includes:
   a first, second and third material stacked in a direction substantially perpendicular to an optical axis;
   the first material being sensitive to long wavelength infrared radiation approximately between 8 and 14 μm in wavelength;
   the second material being sensitive to middle wavelength infrared radiation approximately between 3 and 5 μm in wavelength; and
   the third material being sensitive to short wavelength infrared radiation approximately between 1 and 3 μm in wavelength.

8. The apparatus of claim 1, further comprising:
   a housing enclosing the radiation shield unit, the housing having an interior portion that is vacuum-sealed;
   a housing window attached to the housing to direct the incoming radiation into the diffractive optical array; and a collimating lens positioned between the housing window and the diffractive optical array.

9. The apparatus of claim 1, further comprising:
a power source operatively connected to the detector array for powering the detector array;
a wireless data link operatively connected to the detector array to remotely transmit images received by the detector array;
a controller operatively connected to the detector array for recording the distance between the diffractive optical array and the detector array;
a temperature sensor operatively connected to the controller to measure radiation shield unit temperature, detector array temperature and the ambient temperature in the external environment; and
a global position indicator system operatively connected to the controller for determining the location of the apparatus.

10. The apparatus of claim 1, wherein:
the radiation shield unit includes a first aperture at a first end of the cavity;
the radiation shield unit includes a second aperture at a second end of the cavity;
the diffractive optical array is fitted within the radiation shield unit at the first aperture, the diffractive optical array being movable within the cavity; and
the detector array is fitted within the second aperture, the detector array being movable within the cavity.

11. The apparatus of claim 1, wherein the radiation shield unit has a dimension substantially parallel to an optical axis, the dimension being variable between a first length L1 and a second length L2.

12. The apparatus of claim 11, wherein the radiation shield unit includes a bellows-like element, the bellows-like element being configured to expand or contract in a direction substantially parallel to an optical axis in order to vary the dimension between the first length L1 and the second length L2.

13. An apparatus for identifying and measuring a gas emitted from a source, the apparatus comprising:
a radiation shield unit having a cavity;
a detector array positioned within the cavity, the detector array having a planar surface with at least one infrared detector affixed onto the detector array;
a diffractive optical array positioned within the cavity and in thermal communication with the radiation shield unit, the diffractive optical array including at least one diffractive optic lens;
wherein the diffractive optical array is configured to diffract spectral components of the gas and focus the spectral components onto the detector array, the gas being identified by comparing the spectral components to known spectral signatures;
wherein the apparatus is in an external environment having a predetermined ambient temperature;
wherein the diffractive optical array and radiation shield unit are temperature-controlled to a first temperature; and
wherein the detector array is temperature-controlled to a second temperature.

14. The apparatus of claim 13, wherein the first and second temperatures are within a few degrees of the ambient temperature.

15. The apparatus of claim 13, wherein the first and second temperatures are approximately 123 K or below.

16. The apparatus of claim 13, wherein the first and second temperatures are approximately 77 K or below.

17. The apparatus of claim 13, wherein said gas is a greenhouse gas.

18. A method for imaging incoming radiation, comprising:
directing the incoming radiation towards a radiation shield unit having a cavity;
positioning a detector array within the cavity, the detector array having a planar surface with at least one infrared detector affixed onto the detector array;
positioning a diffractive optical array within the cavity, the diffractive optical array being in thermal communication with the radiation shield unit and spaced from the detector array;
diffracting spectral components of the incoming radiation with the diffractive optical array and directing the spectral components onto the detector array;
measuring an ambient temperature in an external environment around the apparatus;
maintaining the diffractive optical array and radiation shield unit at a first temperature; and
maintaining the detector array at a second temperature;

19. The method of claim 17, wherein the first and second temperatures are within a few degrees of the ambient temperature.

20. The method of claim 17, wherein the first temperature is within a few degrees of the ambient temperature and the second temperature is approximately 77 K or below.

* * * * *